US012056581B1

(12) United States Patent
Masood et al.

(10) Patent No.: US 12,056,581 B1
(45) Date of Patent: Aug. 6, 2024

(54) TRAINING A CHARACTER THROUGH INTERACTIONS

(71) Applicant: Apple Inc., Cupertino, CA (US)

(72) Inventors: Novaira Masood, Foster City, CA (US); Bo Morgan, Emerald Hills, CA (US); Shem Nguyen, San Francisco, CA (US); Mark E. Drummond, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 968 days.

(21) Appl. No.: 16/786,097

(22) Filed: Feb. 10, 2020

Related U.S. Application Data

(60) Provisional application No. 62/804,916, filed on Feb. 13, 2019.

(51) Int. Cl.
*G06N 20/00* (2019.01)
*G06N 3/006* (2023.01)
(Continued)

(52) U.S. Cl.
CPC ............. *G06N 20/00* (2019.01); *G06N 3/006* (2013.01); *G06N 5/022* (2013.01); *G06N 5/04* (2013.01); *G06N 7/01* (2023.01)

(58) Field of Classification Search
CPC ........ G06N 20/00; G06N 3/006; G06N 5/022; G06N 5/04; G06N 7/005; G06N 7/01;
(Continued)

(56) References Cited

U.S. PATENT DOCUMENTS 8,494,981 B2 7/2013 Harrison et al.
10,092,842 B2 10/2018 Rogers
(Continued)

OTHER PUBLICATIONS

Merrick et al., "Motivated Reinforcement Learning for Adaptive Characters in Open-Ended Simulation Games", 2007, Proceedings of the 2007 ACN SIGCHI international conference on Advances in computer entertainment technology, vol. 2007, pp. 1-8 (Year: 2007).*
(Continued)

*Primary Examiner* — Ann J Lo
*Assistant Examiner* — Leonard A Sieger
(74) *Attorney, Agent, or Firm* — Thompson Hine LLP

(57) ABSTRACT

Various implementations disclosed herein include devices, systems, and methods for training of an action determining component of a computer character. In some implementations, actions are taken by the character in a 3D environment according to an action determining component of the character, where the character is rewarded or penalized for interactions associated with an object/concept in the 3D environment according to an assigned object/concept reward or penalty. In some implementations, the reward or the penalty assigned to the object/concept is modified, and the character is then rewarded or penalized for interactions associated with the object/concept according to the modified reward or the modified penalty. The action determining component of the character is trained using a reinforcement learning technique that accounts for rewards or penalties obtained by virtual character for interactions associated with the object/concept.

20 Claims, 12 Drawing Sheets

(51) Int. Cl.
*G06N 5/022* (2023.01)
*G06N 5/04* (2023.01)
*G06N 7/01* (2023.01)

(58) Field of Classification Search
CPC ....... G06T 13/40; G06T 19/006; A63F 13/55; A63F 2300/6009; A63F 2300/6018; A63F 2300/632; A63F 2300/8058; A63F 2300/8082; G05B 2219/39451
See application file for complete search history.

(56) References Cited

U.S. PATENT DOCUMENTS

| | | | |
|---|---|---|---|
| 10,300,387 B2 * | 5/2019 | Okamura | G06F 3/0484 |
| 2011/0099130 A1 | 4/2011 | Blumberg et al. | |
| 2016/0082597 A1 * | 3/2016 | Gorshechnikov | G06V 10/462 901/1 |
| 2018/0197066 A1 | 7/2018 | Osotio et al. | |
| 2019/0101985 A1 * | 4/2019 | Sajda | G06F 3/017 |
| 2019/0353378 A1 * | 11/2019 | Ramamurti | G05B 15/02 |
| 2020/0122039 A1 * | 4/2020 | Meuleau | A63F 13/67 |
| 2020/0122040 A1 * | 4/2020 | Juliani, Jr. | G06N 20/00 |
| 2021/0027164 A1 * | 1/2021 | Richter | G06F 18/217 |

OTHER PUBLICATIONS

Li et al., "Introspective Reinforcement Learning and Learning from Demonstration", 2018, Proceedings of the 17th International Conference on Autonomous Agents and MultiAgent Systems, vol. 2018, pp. 1992-1994 (Year: 2018).*

Mnih et al., "Playing Atari with Deep Reinforcement Learning", 2013, arXiv, v1312.5602v1, pp. 1-9 (Year: 2013).*

Suay et al., "Effect of human guidance and state space size on Interactive Reinforcement Learning", 2011, 2011 RO-MAN, vol. 2011, pp. 1-6 (Year: 2011).*

Thomaz et al., "Reinforcement Learning with Human Teachers: Evidence of Feedback and Guidance with Implications for Learning Performance", 2006, AAAI'06, vol. 2006, pp. 1000-1005 (Year: 2006).*

Reddy et al., "Shared Autonomy via Deep Reinforcement Learning", 2018, arXiv, v1802.01744v2, pp. 1-10 (Year: 2018).*

Reddy et al., "Learning Human Objectives by Evaluating Hypothetical Behavior", Dec. 5, 2019, arXiv, v1, pp. 1-18 (Year: 2019).*

* cited by examiner

TRAINING A CHARACTER THROUGH INTERACTIONS

CROSS-REFERENCE TO RELATED APPLICATION

This Application claims the benefit of U.S. Provisional Application Ser. No. 62/804,916 filed Feb. 13, 2019, which is incorporated herein in its entirety.

TECHNICAL FIELD

The present disclosure generally relates to creating three dimensional (3D) content, and in particular, to systems, methods, and devices for training characters through interactions with such content in 3D layouts.

BACKGROUND

Creating 3D content can be time-consuming, non-intuitive, and/or difficult. Such creation often requires using a mouse or other computer-based input device to painstakingly position and rotate 3D objects in precise positions and relative to other 3D objects.

SUMMARY

Various implementations disclosed herein include devices, systems, and methods that enable more intuitive, visual or efficient training of a virtual character. An electronic device includes a modeled digital 3D environment for modifying reinforcement learning algorithms/policies used by an action determining component (e.g., an agent or brain) of a character. A user (e.g., content creator) is able to alter the actions of such a character by interacting with rewards or penalties for objects or concepts in the 3D environment. In some implementations, visual interactions modify rewards or penalties in a 3D training environment of the character. Visual interactions by a user modify rewards or penalties to prioritize concepts in two ways: (a) visual interactions in the 3D environment; or (b) visual interactions in an imagination space of the character in which past actions or hypothetical futures in the 3D environment can be reviewed by the user. Some implementations of rewards or penalties use an item type including a plurality of related hierarchical items that have corresponding rewards or corresponding penalties (e.g., ontology) so that a plurality of items can be simultaneously and variably prioritized.

In some implementations, an electronic device having a processor implements a method for training of an algorithm/policy used by an action determining component of a character. For example, in a simulated reality (SR) setting provided on an electronic device, a user or other 3D app creator can use visual interactions to train the action determining component. In some implementations, actions are taken by the character in a 3D environment according to an action determining component of the character, where the character is rewarded or penalized for interactions associated with an object or a concept in the 3D environment according to a reward or a penalty assigned to the object or the concept. In some implementations, the reward or the penalty assigned to the object or the concept is modified by user input in the 3D environment, and the character is then rewarded or penalized for interactions associated with the object or the concept according to the modified reward or the modified penalty. The action determining component of the character is trained using a reinforcement learning technique that accounts for rewards or penalties obtained by the character for interactions associated with the object or the concept.

In accordance with some implementations, a non-transitory computer readable storage medium has stored therein instructions that are computer-executable to perform or cause performance of any of the methods described herein. In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
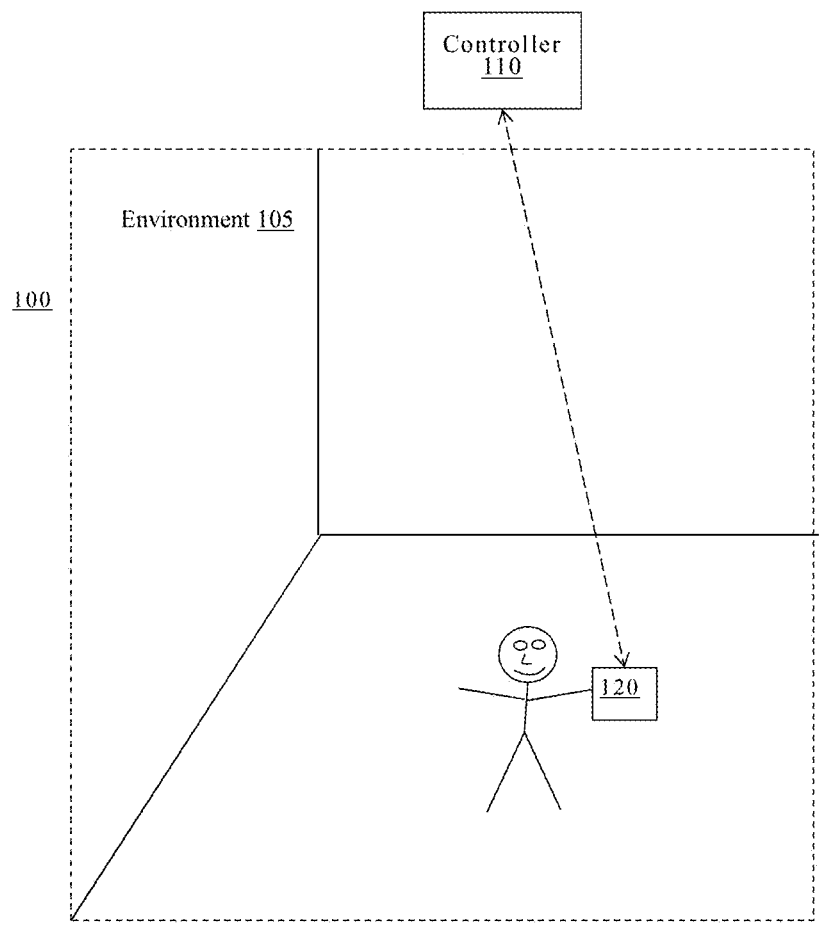
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120, one or both of which may be in a physical setting. A physical setting refers to a world that individuals can sense or with which individuals can interact without assistance of electronic systems. Physical settings (e.g., a physical forest) include physical objects (e.g., physical trees, physical structures, and physical animals). Individuals can directly interact with or sense the physical setting, such as through touch, sight, smell, hearing, and taste.

In some implementations, the controller 110 is configured to manage and coordinate a simulated reality (SR) experience for the user (e.g., content creator). In some implementations, the controller 110 includes a suitable combination of software, firmware, or hardware. The controller 110 is described in greater detail below with respect to FIG. 2. In some implementations, the controller 110 is a computing device that is local or remote relative to the physical setting 105.

In one example, the controller 110 is a local server located within the physical setting 105. In another example, the controller 110 is a remote server located outside of the physical setting 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.).

In some implementations, the electronic device 120 is configured to present the SR experience to the user (e.g., content creator). In some implementations, the electronic device 120 includes a suitable combination of software, firmware, or hardware. The electronic device 120 is described in greater detail below with respect to FIG. 3. In some implementations, the electronic device 120 is a head mounted device (TIMID). In some implementations, the functionalities of the controller 110 are provided by or combined with the electronic device 120.

According to some implementations, the electronic device 120 presents a simulated reality (SR) experience to the user while the user is present within the physical setting 105. In contrast to the physical setting, a SR setting refers to an entirely or partly computer-created setting that individuals can sense or with which individuals can interact via an electronic system. In SR, a subset of an individual's movements is monitored, and, responsive thereto, one or more attributes of one or more virtual objects in the SR setting is changed in a manner that conforms with one or more physical laws. For example, a SR system may detect an individual walking a few paces forward and, responsive thereto, adjust graphics and audio presented to the individual in a manner similar to how such scenery and sounds would change in a physical setting. Modifications to attribute(s) of virtual object(s) in a SR setting also may be made responsive to representations of movement (e.g., audio instructions).

An individual may interact with or sense a SR object using any one of his senses, including touch, smell, sight, taste, and sound. For example, an individual may interact with or sense aural objects that create a multi-dimensional (e.g., three dimensional) or spatial aural setting, or enable aural transparency. Multi-dimensional or spatial aural settings provide an individual with a perception of discrete aural sources in a multi-dimensional space. Aural transparency selectively incorporates sounds from the physical setting, either with or without computer-created audio. In some SR settings, an individual may interact with or sense only aural objects.

One example of SR is virtual reality (VR). A VR setting refers to a simulated setting that is designed only to include computer-created sensory inputs for at least one of the senses. A VR setting includes multiple virtual objects with which an individual may interact or sense. An individual may interact or sense virtual objects in the VR setting through a simulation of a subset of the individual's actions within the computer-created setting, or through a simulation of the individual or his presence within the computer-created setting.

Another example of SR is mixed reality (MR). A MR setting refers to a simulated setting that is designed to integrate computer-created sensory inputs (e.g., virtual objects) with sensory inputs from the physical setting, or a representation thereof. On a reality spectrum, a mixed reality setting is between, and does not include, a VR setting at one end and an entirely physical setting at the other end.

In some MR settings, computer-created sensory inputs may adapt to changes in sensory inputs from the physical setting. Also, some electronic systems for presenting MR settings may monitor orientation or location with respect to the physical setting to enable interaction between virtual objects and real objects (which are physical objects from the physical setting or representations thereof). For example, a system may monitor movements so that a virtual plant appears stationery with respect to a physical building.

One example of mixed reality is augmented reality (AR). An AR setting refers to a simulated setting in which at least one virtual object is superimposed over a physical setting, or a representation thereof. For example, an electronic system may have an opaque display and at least one imaging sensor for capturing images or video of the physical setting, which are representations of the physical setting. The system combines the images or video with virtual objects, and displays the combination on the opaque display. An individual, using the system, views the physical setting indirectly via the images or video of the physical setting, and observes the virtual objects superimposed over the physical setting. When a system uses image sensor(s) to capture images of the physical setting, and presents the AR setting on the opaque display using those images, the displayed images are called a video pass-through. Alternatively, an electronic system for displaying an AR setting may have a transparent or semi-transparent display through which an individual may view the physical setting directly. The system may display virtual objects on the transparent or semi-transparent display, so that an individual, using the system, observes the virtual objects superimposed over the physical setting. In another example, a system may comprise a projection system that projects virtual objects into the physical setting. The virtual objects may be projected, for example, on a physical surface or as a holograph, so that an individual, using the system, observes the virtual objects superimposed over the physical setting.

An augmented reality setting also may refer to a simulated setting in which a representation of a physical setting is altered by computer-created sensory information. For example, a portion of a representation of a physical setting may be graphically altered (e.g., enlarged), such that the altered portion may still be representative of, but not a faithfully-reproduced version of the originally captured image(s). As another example, in providing video pass-through, a system may alter at least one of the sensor images to impose a particular viewpoint different than the viewpoint captured by the image sensor(s). As an additional example, a representation of a physical setting may be altered by graphically obscuring or excluding portions thereof.

Another example of mixed reality is augmented virtuality (AV). An AV setting refers to a simulated setting in which a computer-created or virtual setting incorporates at least one sensory input from the physical setting. The sensory input(s) from the physical setting may be representations of at least one characteristic of the physical setting. For example, a virtual object may assume a color of a physical object captured by imaging sensor(s). In another example, a virtual object may exhibit characteristics consistent with actual weather conditions in the physical setting, as identified via imaging, weather-related sensors, or online weather data. In yet another example, an augmented reality forest may have virtual trees and structures, but the animals may have features that are accurately reproduced from images taken of physical animals.

Many electronic systems enable an individual to interact with or sense various SR settings. One example includes head mounted systems. A head mounted system may have an opaque display and speaker(s). Alternatively, a head mounted system may be designed to receive an external display (e.g., a smartphone). The head mounted system may have imaging sensor(s) or microphones for taking images/video or capturing audio of the physical setting, respectively. A head mounted system also may have a transparent or semi-transparent display. The transparent or semi-transparent display may incorporate a substrate through which light representative of images is directed to an individual's eyes. The display may incorporate LEDs, OLEDs, a digital light projector, a laser scanning light source, liquid crystal on silicon, or any combination of these technologies. The substrate through which the light is transmitted may be a light waveguide, optical combiner, optical reflector, holographic substrate, or any combination of these substrates. In one implementation, the transparent or semi-transparent display may transition selectively between an opaque state and a transparent or semi-transparent state. In another example, the electronic system may be a projection-based system. A projection-based system may use retinal projection to project images onto an individual's retina. Alternatively, a projection system also may project virtual objects into a physical setting (e.g., onto a physical surface or as a holograph). Other examples of SR systems include heads up displays, automotive windshields with the ability to display graphics, windows with the ability to display graphics, lenses with the ability to display graphics, headphones or earphones, speaker arrangements, input mechanisms (e.g., controllers having or not having haptic feedback), tablets, smartphones, and desktop or laptop computers.

Figure 2:
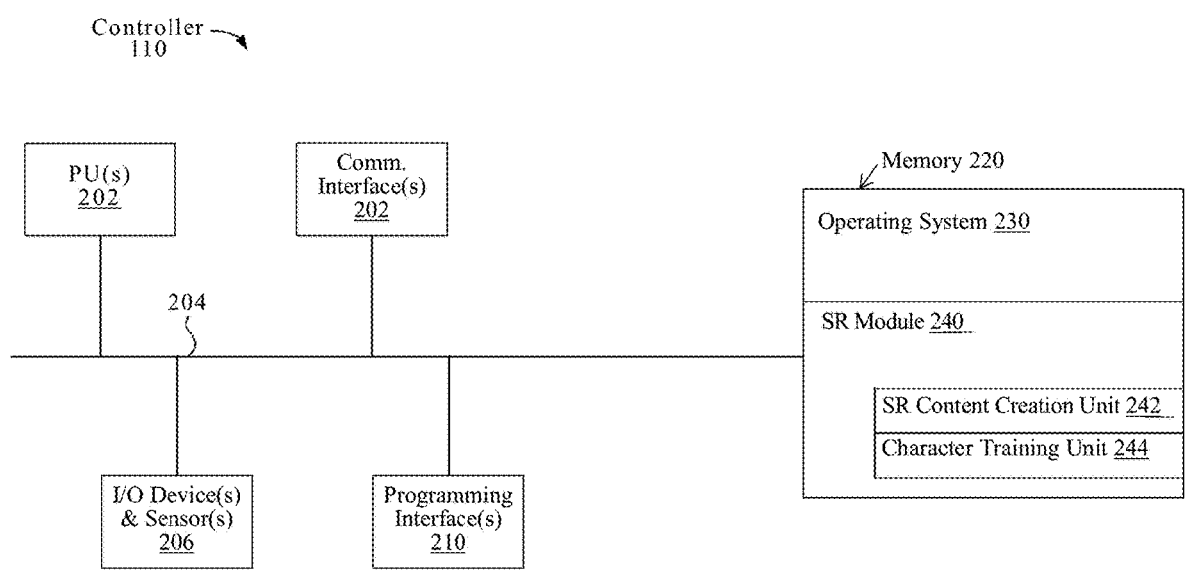
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an SR experience module 240.

The operating system 230 includes procedures for handling various basic system services and for performing hardware dependent tasks. In some implementations, the SR module 240 is configured to create, edit, or experience SR experiences. The 3D content creation unit 242 is configured to create and edit 3D content that will be used as part of SR experiences for one or more users (e.g., a single SR experience for one or more users, or multiple SR experiences for respective groups of one or more users). A content-creation SR experience may be provided by the SR module 240 to facilitate the creation of such content. For example, the user may view and otherwise experience a SR-based user interface that allows the user to select, place, move, and otherwise configure virtual objects in 3D content that is being created or edited, for example, based on providing input via hand gestures, voice commands, input device inputs, etc. The character training unit 244 is configured to facilitate training of an action determining component of a character (e.g., visual interactions in a SR setting on an electronic device). Although these modules and units are shown as residing on a single device (e.g., the controller 110), it should be understood that in other implementations, any combination of the these modules and units may be located in separate computing devices.

Moreover, FIG. 2 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 3:
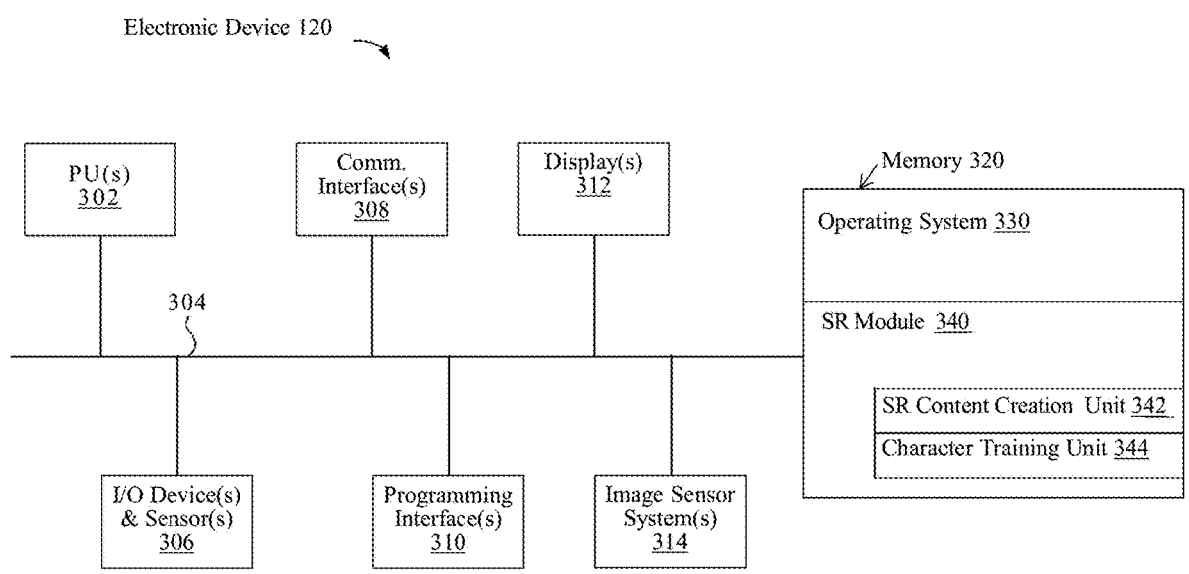
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 310, one or more displays 312, one or more interior or exterior facing image sensor systems 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 312 are configured to present an SR experience to the user. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user.

In some implementations, the one or more image sensor systems 314 are configured to obtain image data that corresponds to at least a portion of the face of the user that includes the eyes of the user. For example, the one or more image sensor systems 314 include one or more RGB cameras (e.g., with a complimentary metal-oxide-semiconductor (CMOS) image sensor or a charge-coupled device (CCD) image sensor), monochrome camera, IR camera, event-based camera, or the like. In various implementations, the one or more image sensor systems 314 further include illumination sources that emit light upon the portion of the face of the user, such as a flash or a glint source.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 33 and a SR module 340.

The operating system 330 includes procedures for handling various basic system services and for performing hardware dependent tasks. In some implementations, the SR module 340 is configured to create, edit, or experience SR experiences. The 3D content creation unit 342 is configured to create and edit 3D content that will be used as part of SR experiences for one or more users (e.g., a single SR experience for one or more users, or multiple SR experiences for respective groups of one or more users). A content creation SR experience may be provided by the SR module 340 to facilitate the creation of such content. For example, the user may view and otherwise experience a SR-based user interface that allows the user to select, place, move, and otherwise configure virtual objects in 3D content that is being created or edited, for example, based on providing input via hand gestures, voice commands, input device inputs, etc. The character training unit 344 is configured to facilitate training of an action determining component of a character. Although these modules and units are shown as residing on a single device (e.g., the electronic device 120), it should be understood that in other implementations, any combination of these modules and units may be located in separate computing devices.

Moreover, FIG. 3 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 4:
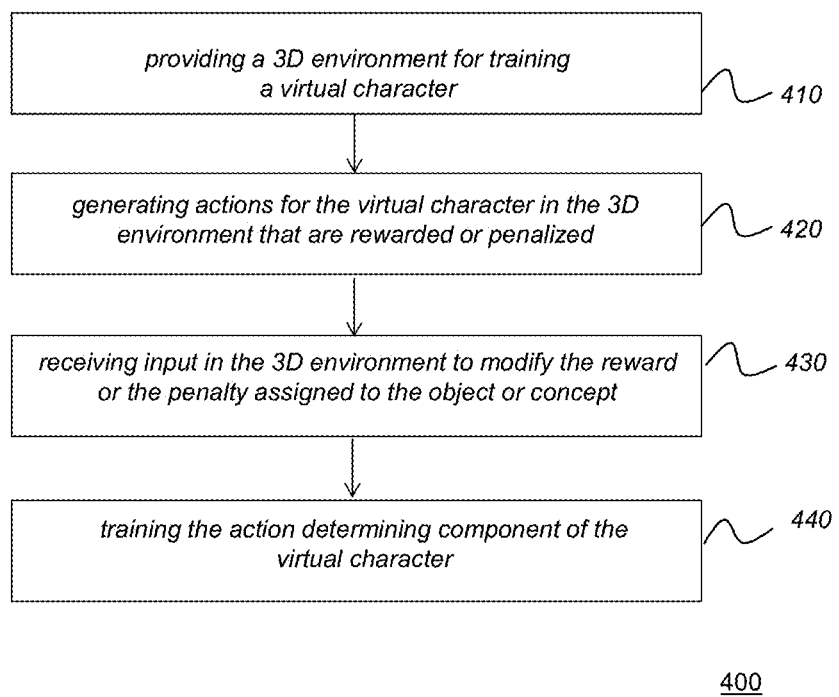
FIG. 4 is a flowchart illustrating an exemplary method of selectively training an action determining component of a character according to some implementations.

FIG. 4 is a flowchart illustrating an exemplary method 400 of selectively training an action determining component of a virtual character. In some implementations, the method 400 is performed by a device (e.g., controller 100 or electronic device 120 of FIGS. 1-3). The method 400 can be performed at a mobile device, HMD, desktop, laptop, server device, or by multiple devices in communication with one another. In some implementations, the method 400 is performed by processing logic, including hardware, firmware, software, or a combination thereof. In some implementations, the method 400 is performed by a processor executing code stored in a non-transitory computer-readable medium (e.g., a memory).

The phrase "virtual character" refers to a virtual object that exhibits or is configured to exhibit a behavior, movement, animation, or other change in an SR setting. The change exhibited by a virtual character may be determined by a content creator and/or in response to interactions and other activity in the SR setting. A virtual character may be trained in an SR setting to respond to interactions and other activity, e.g., via reinforcement learning and techniques disclosed herein. Examples of virtual characters include avatars, non-player characters (NPCs), animated creatures, and animated objects.

At block 410, the method 400 provides a 3D environment for training an action determining component of a character using reinforcement learning. In some implementations, an interactive user interface (UI) on an HM4D displays a 3D environment in which an action determining component (e.g., "brain") of a character will be trained to behave in particular ways based on reinforcement learning. In some implementations, the action determining component operates or makes decisions according to underlying complex reinforcement learning policies, algorithms, action algorithms, decision trees, etc. The action determining component constantly learns or has its underlying reinforcement learning policies/algorithms modified by interactions with the 3D environment.

At block 420, the method 400 generates actions for the character in the 3D environment according to the action determining component of the character. In various implementations, the character is rewarded or penalized for interactions associated with an object or a concept in the 3D environment according to a reward or a penalty assigned to the object or concept. In some implementations, the character can be uninitialized (e.g., a "baby"), but preferably the character is initialized, for example to wander randomly around the 3D environment interacting with the 3D environment. In some implementations, the character moves around the 3D environment, and interacts with the environment (e.g., touches objects, smells objects, moves objects, etc.) automatically based on its action determining component. In some implementations, the action determining component accounts for a plurality of "states" of the environment. In some implementations, character actions or decisions result in changes to the state of the environment.

At block 430, the method 400 receives input in the 3D environment to modify the reward or the penalty assigned to the object or concept, which causes the character to be rewarded or penalized for interactions associated with the object or the concept according to the modified reward or the modified penalty. In various implementations, the user interacts with the 3D environment to change the significance of a character action associated with an object or concept by adding a positive reward or a negative penalty to the object or the concept, or a priority between/among objects or concepts. For example, the user adds +1 to a cash register and the character gets more reward for going near the cash register than before. For example, the user interacts to prioritize the color orange over the color blue. For example, the user operates the UI to make the character like "patents", and when choosing a book from a library, the character will be influenced toward selecting a book within the subject of patents. In some implementations, the user is a content creator or a person using the electronic device in a SR setting.

In various implementations, the interactions can modify rewards or penalties to prioritize the object or concept in two ways: (i) visual actions in real time in the 3D environment (e.g., tag a coffee cup or location with +/−point); or (ii) visual interactions in an imagination space of the character where past actions or hypothetical futures in the 3D environment can be reviewed.

In various implementations, the interaction can be a visual interaction by the user (e.g., the user reaching out and tapping the cash register). In some implementations, the visual interaction may be obtained by identifying a 3D hand gestures or a 3D movement of a 3D input device, e.g., a user moves the table using a six degree of freedom input device. In some implementations, an object or concept such as a coffee cup is selected from a global set that includes multiple objects using hand gestures, eye movements, voice commands, user interface controls, etc.

At block 440, the method 400 trains the action determining component of the character using a reinforcement learning technique that accounts for rewards or penalties obtained by the character for interactions associated with the object or the concept. In some implementations, the general reinforcement learning algorithms for the action determining component are instantaneously updated based on the character obtaining the modified reward or the modified penalty in the 3D environment. In some implementations, the general reinforcement learning algorithms for the action determining component are instantaneously updated based on user interaction to modify a significance of the object or the concept.

In some implementations, the method 400 is used in a reinforcement learning model in which an agent (e.g., the reinforcement policy/algorithm of a character) determines how a character will interact with an environment of objects/concepts (e.g., the 3D environment being viewed by a user). The environment may start by sending a state to the agent, which then based on its knowledge (e.g., the current the reinforcement policy/algorithm) takes an action in response to that state. After that, the environment sends a next state and a reward/penalty (if any) back to the agent. The agent updates its knowledge with the reward/penalty returned by the environment to its last action. This loop can continue until an end point is reached, e.g., when the environment sends a terminal state that ends the training episode. In this way, the agent may learn action-values, for example, based on the long term expectations of taking various actions in various different states of the environment. In this example, the phrase "action" refers to a possible movement or other behavior the agent can take. In this example, the phrase "state" refers to the current situation returned by the environment. In this example, "reward" and "penalty" refer to information sent back from the environment to be used by the agent in evaluating its last action. In this example, the phrase "policy" refers to the strategy that the agent employs to determine a next action based on the current state. The phrase "expected-long term value" refers to expected long-term return (with or without discount), as opposed to short term reward/penalty and can be defined as the expected long-term return of the current state under a policy. The phrase "action-value" refers to the long term value of taking an action under a policy for the current state.

Figure 5A:
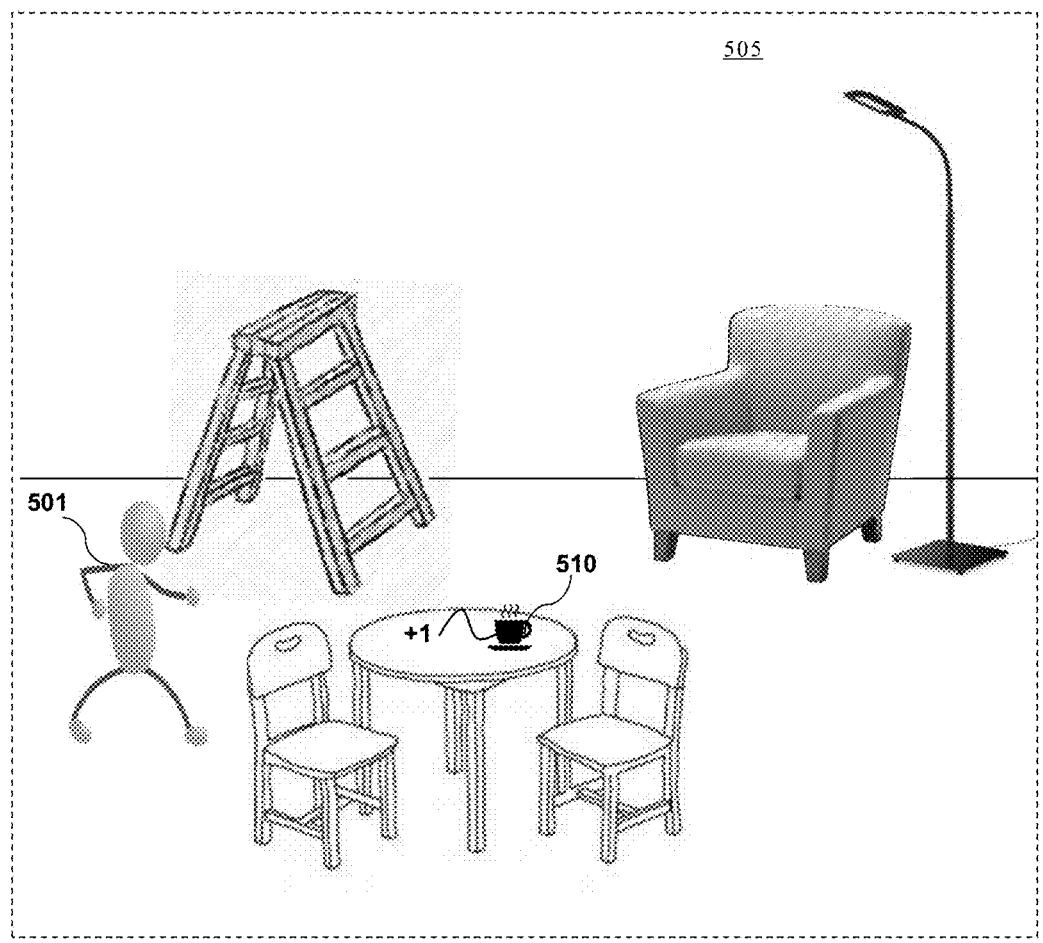
FIGS. 5A-5C are diagrams that illustrate exemplary interactions to modify the reward or the penalty assigned to objects or concepts in a 3D environment for training a character in accordance with some implementations.
Figure 5B:
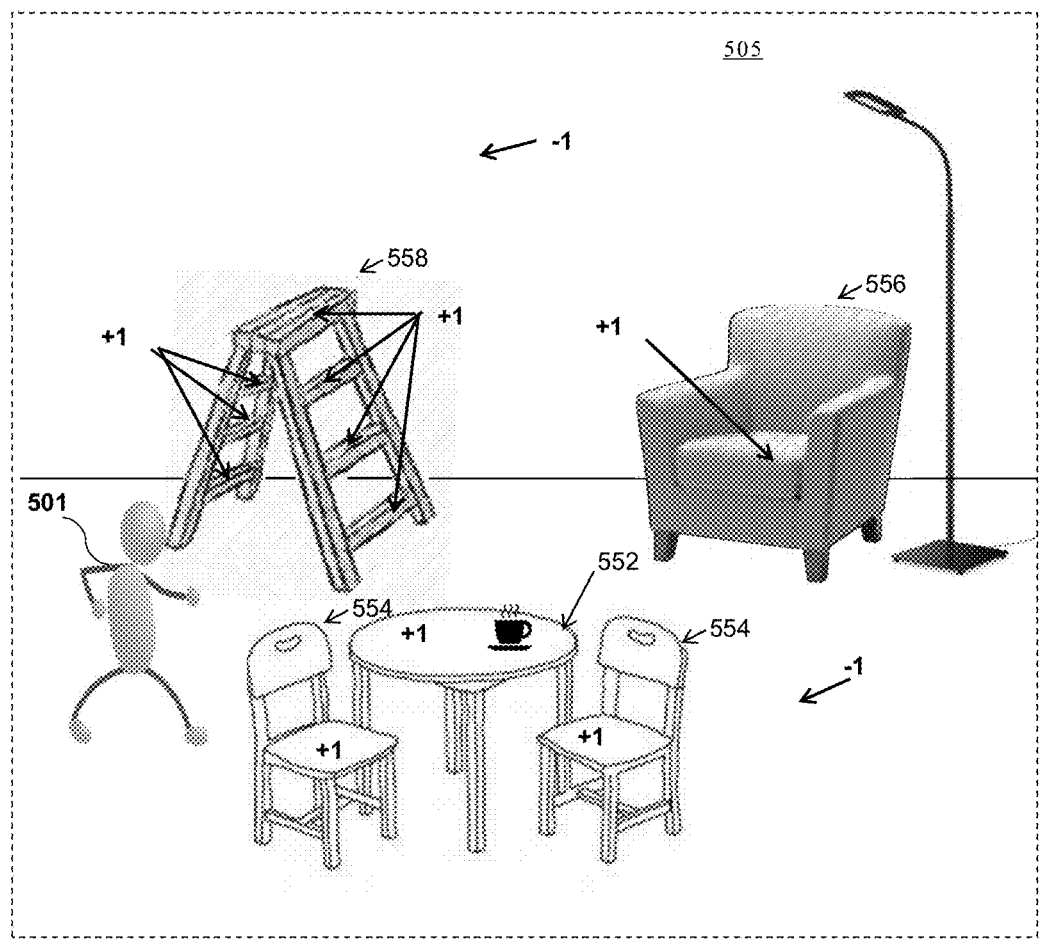
Figure 5C:
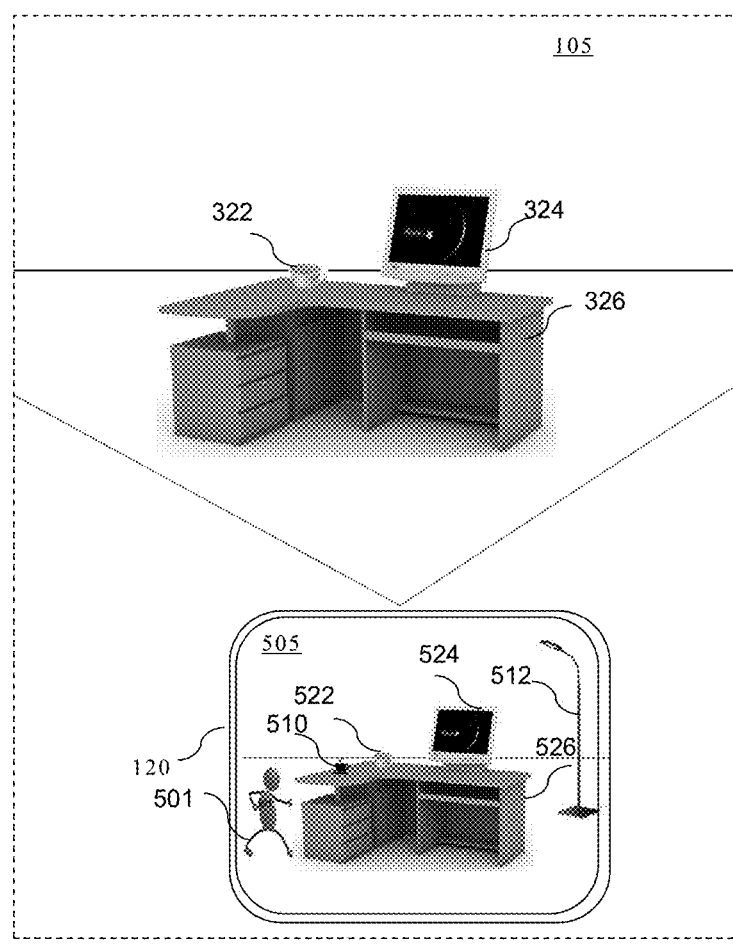

FIGS. 5A-5C illustrate exemplary interactions to modify the reward or the penalty assigned to objects or concepts in a 3D environment for training a character in accordance with some implementations. FIG. 5A depicts objects in an SR setting 505.

As shown in FIG. 5A, a character or robot 501 is placed in a 3D environment, namely the SR setting 505, for training. In some implementations, the action determining component of the robot 501 is initialized to randomly wander the SR setting 505. In some implementations, the action determining component of the robot 501 is initialized to interact with objects in the SR setting 505 that the robot 501 passes by during the random wandering. In various implementations, the robot 501 is constantly re-planning to optimize its experience. In some implementations, the robot 501 optimizes its experience in the SR setting 505 by gathering as many rewards as possible and as few penalties as possible to result in the largest positive cumulative reward value at the end of the experience.

In some implementations, the robot 501 can use greedy model behavior when generating next actions in the SR setting 505 for getting rewards and avoiding penalties of prioritized objects or concepts. In some implementations, the robot 501 gets rewards or penalties only for "exact matches" of prioritized objects. In some implementations, example model behaviors for the robot 501 can receive rewards or penalties for a "similar match" for related objects that are not an "exact match". In some implementations, using the greedy model behavior with exact matches, when the robot 501 senses (e.g., sees, smells, hears, etc.) an object having a positive reward, the robot 501 will directly move to obtain the positive reward. In some implementations, the robot 501 will move optimally (e.g., shortest route, quickest time). Alternatively, in some implementations, the robot 501 can use a non-greedy model behavior that considers longer time periods into the future so that the robot 501 can potentially gather multiple rewards, or potentially go through negative actions or areas that incur penalties to get to positive actions or areas that result in greater total overall rewards. In some implementations, the robot 501 can use other model behaviors known to one skilled in the art.

As shown in FIG. 5A, a hot beverage 510 on the table has been edited in the UI to have a +1 reward. In this example, the robot 501 uses "exact matching" and the greedy model behavior and begins randomly travelling the SR setting 505 until the robot 501 finds and gets the positive reward for the hot beverage 510. Now, the robot 501 knows how to get a reward, and the robot 501 will account for this new information in determining its future actions. Using the greedy model behavior, the robot 501 may tend to stay close to the table, e.g., circling around the table to gather as much of that hot beverage 510 reward as possible. If rewards are encountered in other areas, the robots 501 may learn learnt tend to stay close to one or more of those rewards or to travel in the areas between the rewards more than in other areas of the environment.

As shown in FIG. 5A, the user can visually change the reward structure in the SR setting 505 (e.g., increasing the reward associated with the hot beverage 510 by +1 reward), and the robot 501 will learn and modify its action determining component to change future actions. Thus, as the robot encounters the hot beverage 510 and is rewarded with the greater reward, the action determining component of the robot is adjusted accordingly. The higher the value of the reward, the more likely the robot is to perform actions associated with that reward, e.g., the more likely the robot is to move closer to the hot beverage 510 versus away from that hot beverage 510.

FIG. 5B is a diagram showing a 3D environment for training a character including a UI in accordance with some implementations. In some implementations, the user wants to create a jumping character for a final application. To train such a jumping character, as shown in FIG. 5B, first, the user edits flat surfaces other than the floor and the wall in the UI to have a +1 reward. In this example, the robot 501 begins by randomly travelling the SR setting 505 until the robot 501 finds a positive reward or a negative penalty. The robot encounters rewards and associated properties of the objects associated with the rewards, e.g., the flat surface property of those objects. As shown in FIG. 5B, a flat surface of table 552, a flat surface of chairs 554, a flat surface of chair 558, and a flat surface of ladder 558 each receive a +1 attractor. With the +1 attractors, the robot 501 learns to like flat surfaces of chairs 552, 556, table 512, and ladder 558. Second, the user pauses the training, and edits the floor and wall in the UI to have a −1 penalty. Upon re-starting the training, the robot 501 learns to avoid the wall and the floor to generate a higher overall cumulative reward. The robot may learn to do so by jumping from chair to table to ladder, etc. In this example, the robot 501 has been trained to be more likely to jump, in effect, the robot 501 has been given a personality that likes jumping. The jumping behavior is "programmed" into the robot 501 based on the modified rewards or the modified penalty assigned objects in the 3D environment of the SR setting 505.

In some implementations, the behavior of the action determining component is not tied to a context and can continue when placed the character is placed in another environment. In some implementations, the user trains a character in a training environment (e.g., to prefer jumping over walking) and then packages up the trained character for use in a different application according the behaviors learned in the training environment. Thus, a jumping behavior can be "programmed" into the action determining component of the robot 501 through the UI and the modified rewards or the modified penalty assigned to objects in the 3D environment of the SR setting 505. In some implementation, a character can be trained to be "strong" and is able to move (e.g., push) objects up to a preset weight or a preset size out of its way when acting in the SR setting 505.

FIG. 5C is a diagram showing a 3D environment for training a character including a UI in accordance with some implementations. In some implementations, real world items exist in the physical setting 105 and have corresponding representations in the SR setting 505. As shown in FIG. 5C, a teacup 322, a computer 324, and a desk 326 exist in the physical setting 105. A teacup 522, a computer 524, and a desk 526 are concurrent real-time representations in the SR setting 505 of the teacup 322, the computer 324, and the desk 346. The coffee 510 and a lamp 512 also are in the SR setting 505 with the robot 501. Any object in the SR setting 505 (e.g., the teacup 522, computer 524, desk 526, coffee 510, lamp 512, etc.) can have its reward or penalty edited by the user to change the action determining component of the robot 501.

Figure 6A:
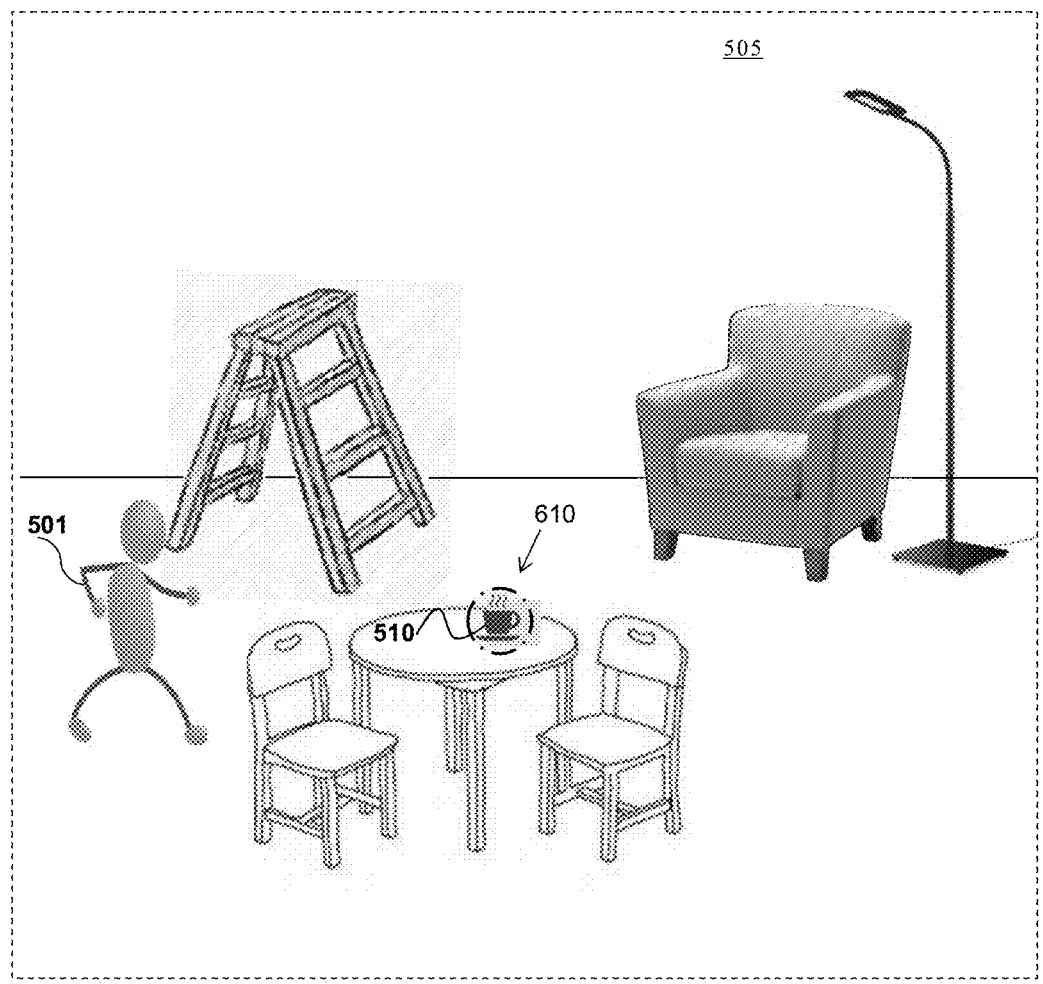
FIGS. 6A-6B are diagrams that illustrate exemplary interactions to modify the reward or the penalty assigned to objects or concepts in a 3D environment for training a character in accordance with some implementations.
Figure 6B:
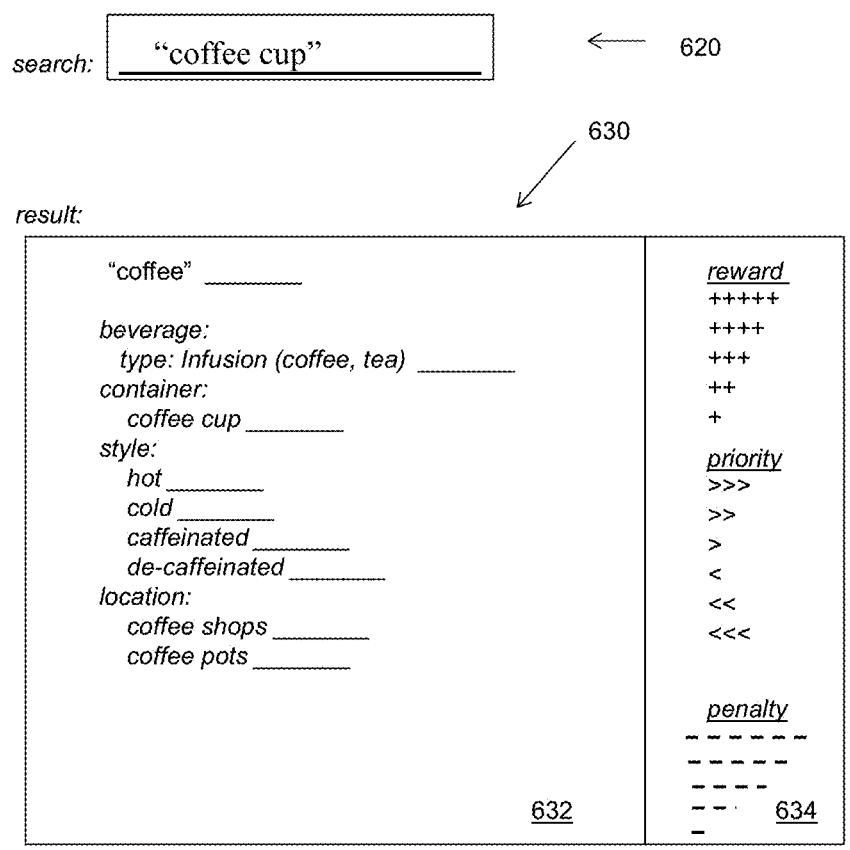

FIGS. 6A-6B are diagrams showing a 3D environment for training a character including a UI in accordance with some implementations. In some implementations, the user performs a search for labeling an item in the SR setting 505 and providing the corresponding reward or penalty. In some implementations, instead of using a unique tag, a plurality of related hierarchical items can be accessed using a single search. In some implementations, one or more item types can be used so that when an item "coffee" is searched, a plurality of related hierarchical items for "coffee" is returned and presented to the user. In some implementations, when a user enters a search term in a search functionality, an ontology for the search term is returned. In some implementations, as shown in FIG. 6A, when a user highlights the coffee cup 510 in the SR setting 505 with a search ring 610, a search window 620 becomes available as shown in FIG. 6B. Upon searching an entered search term, "coffee cup", for the search ring 610 using the search window 620, an ontology 630 is returned for "coffee cup" that includes information identifying that coffee is served in a coffee cup, coffee is a beverage, coffee is an infusion type beverage, coffee is served hot or cold, coffee is caffeinated or de-caffeinated, coffee is found at coffee shops or coffee pots. Thus, a larger set or a plurality of related items can be modified at one time, together, and in a related manner by the user for training of the action determining component of the robot 501. In some implementations, the search term in the search window 620 can be changed before searching. In some implementations, the ontology 630 includes a list of hierarchical related items 632 and a manner of entering the "significance" of the items 632. The example significance 634 includes weighted reward, weighted priority or weighted penalty. As shown in FIG. 6B, in some implementations, a significance 634 can be quickly selected for each of the list of hierarchical related items 632. In various implementations, the significance 634 of the items 632 can be automatically entered, semi-automatically entered, manually entered, or a combination thereof according to the significance of the searched item. For example, if "coffee cup" receives a significance of +++++, coffee shops and coffee pots may automatically receive a significance of +++. Further, items can be added or deleted from the list of hierarchical related items 632. For example, prioritizing coffee>>>tea can be added to the ontology 630.

In some implementations, the modified ontology is stored with the single item. Thus, in some implementations, the ontology 630 can be accessed or modified with the item "coffee cup".

Figure 7A:
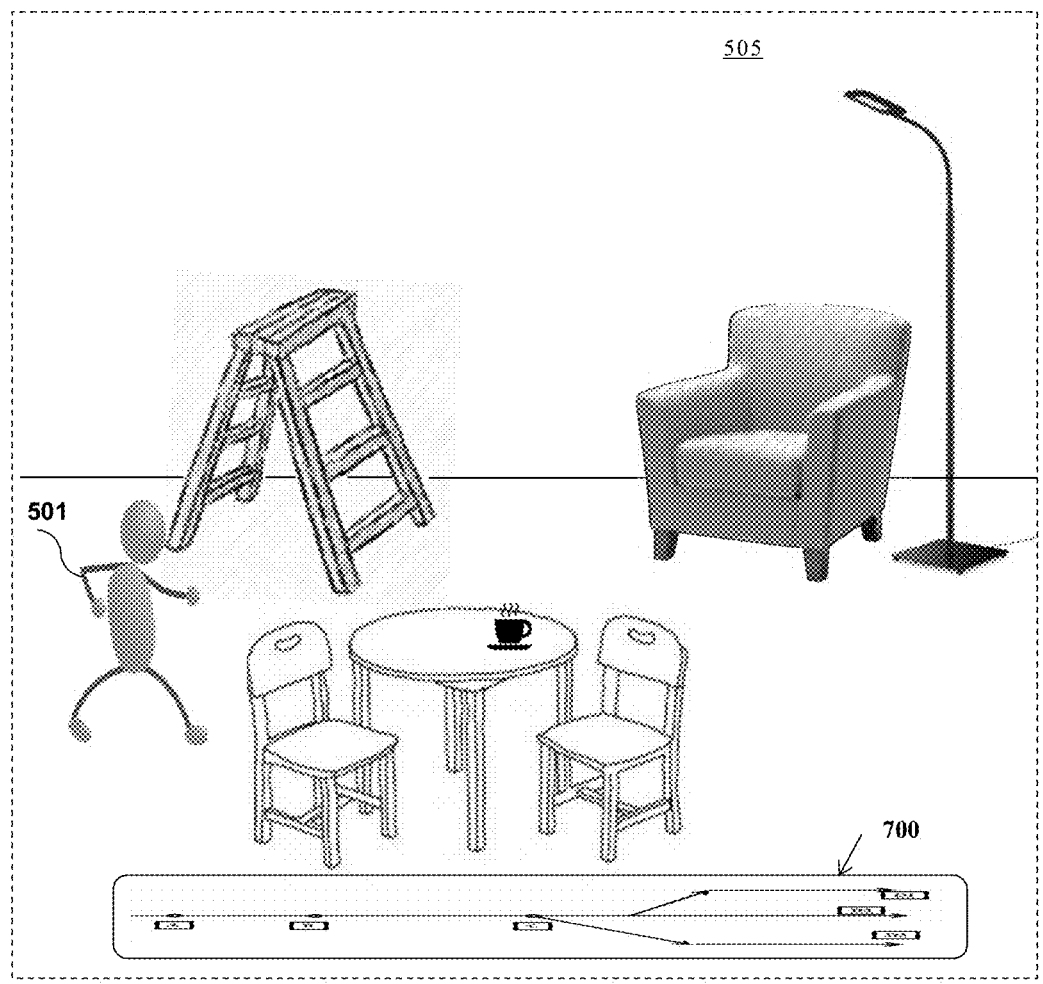
FIGS. 7A-7B are diagrams showing a 3D environment for training a character including a UI in accordance with some implementations.
Figure 7B:
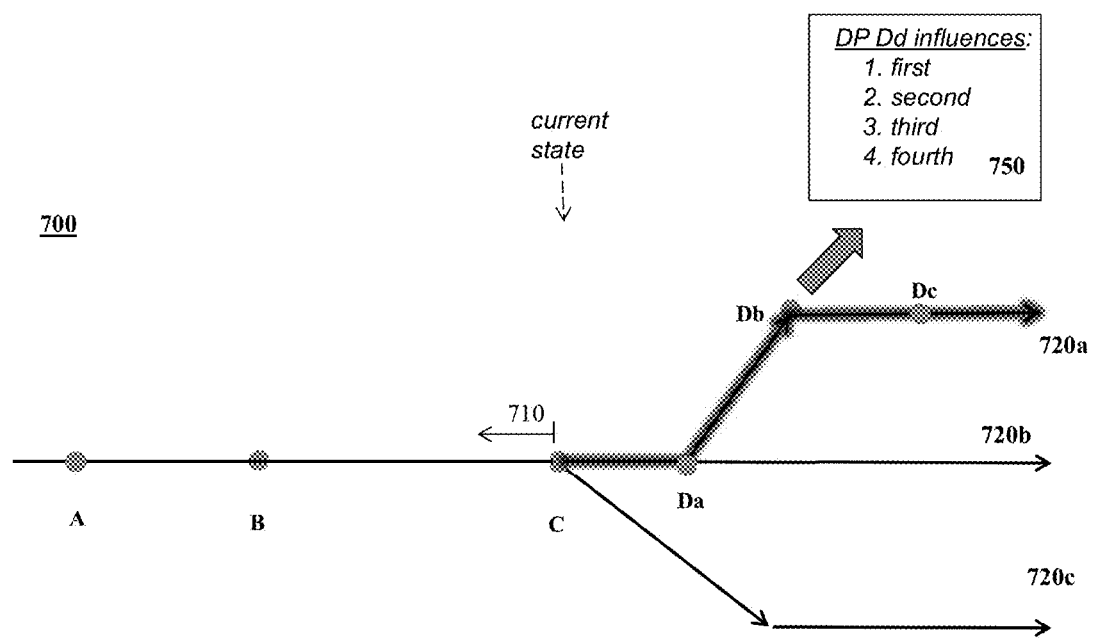

FIGS. 7A-7B are diagrams showing a 3D environment for training a character including a UI in accordance with some implementations. In some implementations, not only are the physical actions of the robot 501 visible in the 3D environment of the SR setting 505, but the user can also access an imagination space 700 of the robot 501. In some implementations, because the robot 501 is repeatedly determining actions (e.g., to optimize its rewards), the user can select the imagination space 700 and "scrub" time forward and backward in the imagination space 700 of the robot 501. This is not the same as running the simulation forward in time with the robot 501 acting in the SR setting 505. In the imagination space 700, the user can move forward in time and review more than one possible future for the robot 501 (e.g., some or all possible ways the robot 501 goes forward in time).

In various implementations, the user can select and interact with specific possible futures and a historical timeline in the imagination space 700. In some implementations, the user can interact with a timeline and edit rewards and penalties for objects or concepts in the SR setting 505 based on actions of the robot 501 in the imagination space 700 while remaining in the imagination space 700. In some implementations, the user can review deterministic decision points in a selected timeline, by selecting a specific decision point, and analyzing the top set of reasons (e.g., 1-5 reasons) the robot 501 made one specific decision at the selected decision point.

As shown in FIG. 7A, the imagination space 700 can be selectable by the user in the SR setting 505. Upon selection of the imagination space 700, the user can select a past timeline 710 or one of a plurality of future timelines 720a, 720b, or 720c. Upon selection of a timeline, e.g., timeline 720a is selected as shown in FIG. 7B, the user can "scrub" time forward and backward in the imagination space 700 of the robot 501 and view hypothetical actions of the robot 501 in the future in the SR setting 505. In some implementations, when timeline 720a is selected, only timeline 720a is viewable. While scrubbing the timeline 720a, the user can review deterministic decision points such as decision point Da, decision point Db, decision point Dc, etc. Upon selection of a decision point, information 750 is displayed. The decision point Db is selected as shown in FIG. 7B. Information 750 is provided to give the user an insight or an indication why the robot 501 is at the selected decision point (e.g., decision point Dd). In some implementations, the information 750 can be the top 1-5 reasons a specific decision was made at the decision point. Information 750 can be a dialog window, a pop up display, a 3D object, or the like.

Upon reviewing the information 750, the user can the modify rewards or penalties for one or more objects or concepts in the SR setting 505 to effect the training the action determining component of the robot 501. In some implementations, the user can modify the rewards or penalties for one or more objects or concepts in the SR setting 505 while at the time of the selected decision point, or earlier or later on the selected timeline. Thus, for example, the user could move back in time before the selected decision point, modify one or more rewards or penalties, and then proceed forward in time to review changes, if any, to that previously selected decision point (e.g., as a result of the modified reward or penalty).

Thus, in various implementations, the user trains the action determining component of the robot 501 in the imagination space 700 or based on actions in the imagination space 700 of the robot 501. In some implementations, the user visually trains the action determining component of the robot 501 in the imagination space 700 according to hypothetical futures envisioned by the robot 501.

Figure 8:
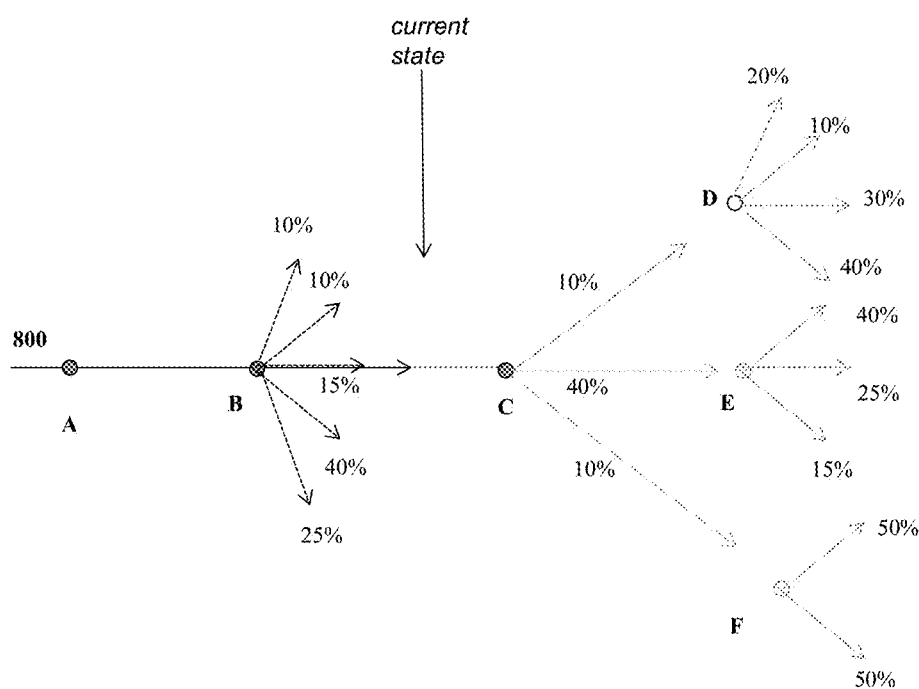
FIG. 8 is a block diagram illustrating probabilistic options at a decision point in a timeline of a character in accordance with some implementations.

FIG. 8 is a block diagram illustrating probabilistic options at a decision point in a timeline of a character in accordance with some implementations. branching tree structure. In some implementations, a future timeline of a character is a linear path through a branching tree structure of possible outcomes. In some implementations, the difference between a current state of the SR setting 505 and a next state of the SR setting 505 is a decision point where the character performs a specific action among multiple possible outcomes. Since the action determining component is probabilistic, at any decision point, the highest probability does not always happen so that the outcome is not certain. However, once the decision is made at each decision point, the outcome is known, and the discrete action taken by the character is determined. As shown in FIG. 8, although five outcomes were possible at decision point B on timeline 800, an outcome having the probability of 15% was the actual outcome. In some implementation, underlying causal models generate the possible outcomes, and why or how the character reached each specific decision point can be reviewed in the information 750.

In some implementations, the robot 501 (e.g., the action determining component) includes an editable "personality" factor specific to the robot 501. In some implementations, the editable personality factor adjusts reward or penalties to one or more objects or concepts in the SR environment 505. For example, the editable "personality" factor can be a "curiosity" personality factor that causes the robot 501 to receive increased rewards for visiting or seeing objects (e.g., places) or concepts that the robot 501 knows about, but has not seen in a while (e.g., an hour, a day, a week). Thus, the "curiosity" personality factor increases rewards based on a time weighting (e.g., increase over time) so the robot 501 becomes curious to re-visit selected objects or concepts. In some implementations, the editable personality factor is modified by the user (e.g., during the training experience). In some implementations, the editable personality factor for the robot 501 effects all objects or concepts in the SR environment 505.

The techniques disclosed herein are applicable in numerous different contexts. In some implementations, the techniques are used to create or edit 3D content that will be included in a SR-based game, app, video, or user interface.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

In some implementations, a non-transitory computer-readable storage medium, stores program instructions computer-executable on a computer to perform operations including exemplary methods disclosed herein. In some implementations, a system includes a non-transitory computer-readable storage medium; and one or more processors coupled to the non-transitory computer-readable storage medium, wherein the non-transitory computer-readable storage medium includes program instructions that, when executed on the one or more processors, cause the system to perform exemplary methods disclosed herein. In some implementations, a non-transitory computer-readable storage medium, stores program instructions computer-executable on a computer to perform operations including exemplary methods disclosed herein are implemented on an electronic device including a processor.

In some implementations, a 3D environment is provided for training an action determining component of a virtual character using reinforcement learning, and generating actions for the virtual character in the 3D environment according to the action determining component of the virtual character, wherein the virtual character is rewarded or penalized for interactions associated with an object or a concept in the 3D environment according to a reward or a penalty assigned to the object or concept. Then, input in the 3D environment is received to modify the reward or the penalty assigned to the object or concept, wherein the character is rewarded or penalized for interactions associated with the object or the concept according to the modified reward or the modified penalty. In some implementations, the action determining component of the virtual character is trained using a reinforcement learning technique that accounts for rewards or penalties obtained by the virtual character for interactions associated with the object or the concept.

In some implementations, the reward or the penalty represents a corresponding significance. In some implementations, the reward or the penalty includes a value within a range of values assigned to the object or concept in the 3D environment. In some implementations, the object or concept includes a plurality of related hierarchical items or ontology. In some implementations, the plurality of related hierarchical items includes corresponding rewards or corresponding penalties that are variably prioritized according to the modified reward or the modified penalty. In some implementations, a corresponding reward or a or corresponding penalty for one or more of the plurality of related hierarchical items interactively modified.

In some implementations, input received in the 3D environment includes receiving a visual selection of the object and adding a positive or a priority reward to the object in the 3D environment. In some implementations, input received in the 3D environment includes receiving a visual selection in the 3D environment adding or modifying conditional relationships between the virtual character and actionable elements of the 3D environment.

In some implementations, input received in the 3D environment (e.g., to modify the reward or the penalty assigned to the object or concept) includes receiving a visual interaction to modify the reward or the penalty in an imagination space of a planning system of the virtual character. In some implementations, the imaginations space is a SR setting that provides specific possible future timelines and a historical timeline in the 3D environment of interactions with the 3D environment from the point of view of the virtual character, wherein a timeline includes a plurality of deterministic decision points. In some implementations, a visual interaction is received to move in time along the timeline before the visual interaction to modify the reward is received.

In some implementations, an interaction is received for selection of the imagination space of the virtual character, and a visual interaction is received to progress forward in time along a future timeline and review hypothetical future actions of the virtual character in the imagination space. In some implementations, at least one of a plurality of decision points in the future timeline is selected, and a plurality of hierarchical factors used to generate a resulting deterministic decision at the selected decision point are reviewed. In some implementations, a visual interaction is received to modify the reward or the penalty on the future timeline of the imagination space, and the reinforcement learning technique for the action determining component of the virtual character is updated with the modified reward or the modified penalty from the imagination space.

In some implementations, an interaction is received for selection of the imagination space of the virtual character, and a visual interaction is received to progress backward in time along a historical timeline and review previous actions of the virtual character in the imagination space. In some implementations, at least one of a plurality of decision points in the historical timeline is selected, and a plurality of hierarchical factors used to generate a resulting deterministic decision at the selected decision point are reviewed. In some implementations, a visual interaction is received to modify the reward or the penalty on the historical timeline of the imagination space, and the reinforcement learning technique for the action determining component of the virtual character is updated with the modified reward or the modified penalty from the imagination space.

In some implementations, the reinforcement learning technique for the action determining component of the virtual character is periodically updated during real-time actions of the virtual character in the 3D environment. In some implementations, input in the 3D environment includes audio or voice input.

In some implementations, the 3D environment is provided on a display screen, a virtual reality 3D environment or a head mounted display. In some implementations, the trained virtual character is provided or transferred to an application or 3D virtual environment.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various objects, these objects should not be limited by these terms. These terms are only used to distinguish one object from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, objects, or components, but do not preclude the presence or addition of one or more other features, integers, steps, operations, objects, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations, but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A non-transitory computer-readable storage medium, storing program instructions computer-executable on a computer to perform operations comprising:
    providing a 3D environment for training an action determining component of a virtual character using reinforcement learning;
    generating actions for the virtual character in the 3D environment according to the action determining component of the virtual character, wherein the virtual character is rewarded or penalized for interactions associated with an object in the 3D environment according to object data assigned to the object and specifying a reward or a penalty to be given to the virtual character each time it has an interaction with the object;
    receiving input in the 3D environment to modify the object data assigned to the object to modify the reward or the penalty to be given to the virtual character each time it has the interaction with the object, wherein the virtual character is rewarded or penalized for interactions associated with the object according to the modified reward or the modified penalty;
    training the action determining component of the virtual character using a reinforcement learning technique that accounts for rewards or penalties obtained by the virtual character for interactions associated with the object;
    receiving a visual interaction to progress forward in time along a future timeline of potential decision points and review hypothetical future actions of the virtual character; and
    receiving a visual interaction to modify the reward or the penalty on the future timeline for assignment to the virtual character, wherein modifying the reward or the penalty on the future timeline is based on a selected decision point of the potential decision points, the selected decision point associated with a hypothetical future action of the hypothetical future actions.

2. The non-transitory computer-readable storage medium of claim 1, wherein the object includes a plurality of related hierarchical items, further comprising:
    interactively modifying a corresponding reward or a corresponding penalty for one or more of the plurality of related hierarchical items.

3. The non-transitory computer-readable storage medium of claim 2, wherein the object includes an ontology, wherein the plurality of related hierarchical items include corresponding rewards or corresponding penalties that are variably prioritized according to the modified reward or the modified penalty.

4. The non-transitory computer-readable storage medium of claim 1, wherein receiving input in the 3D environment to modify the object data assigned to the object comprises:
receiving a visual or voice selection of the object and adding a positive or a priority reward to the object in the 3D environment.

5. The non-transitory computer-readable storage medium of claim 1, wherein receiving input in the 3D environment to modify the object data assigned to the object comprises:
receiving a visual selection in the 3D environment adding conditional relationships between the virtual character and actionable elements of the 3D environment.

6. The non-transitory computer-readable storage medium of claim 1, wherein receiving input in the 3D environment to modify the object data assigned to the object comprises:
receiving a visual interaction to modify the object data in an imagination space of a planning system of the virtual character.

7. The non-transitory computer-readable storage medium of claim 6, wherein the imagination space is a SR setting that provides specific possible future timelines and a historical timeline in the 3D environment of interactions with the 3D environment from the point of view of the virtual character, wherein a timeline includes a plurality of deterministic decision points.

8. The non-transitory computer-readable storage medium of claim 7, further comprising:
receiving an interaction for selection of the imagination space of the virtual character;
receiving a visual interaction to visually review a plurality of hierarchical factors used to generate a resulting deterministic decision at the selected decision point;
updating the reinforcement learning technique for the action determining component of the virtual character with the modified reward or the modified penalty on the future timeline from the imagination space.

9. The non-transitory computer-readable storage medium of claim 7, further comprising receiving a visual interaction to move in time along the timeline before the visual interaction to modify the reward is received.

10. The non-transitory computer-readable storage medium of claim 1, further comprising:
providing the trained virtual character to an application or 3D virtual environment.

11. A device comprising:
a non-transitory computer-readable storage medium; and
one or more processors coupled to the non-transitory computer-readable storage medium, wherein the non-transitory computer-readable storage medium comprises program instructions that, when executed on the one or more processors, cause the device to perform operations comprising:
providing a 3D environment for training an action determining component of a virtual character using reinforcement learning;
generating actions for the virtual character in the 3D environment according to the action determining component of the virtual character, wherein the virtual character is rewarded or penalized for interactions associated with an object in the 3D environment according to object data assigned to the object and specifying a reward or a penalty to be given to the virtual character each time it has an interaction with the object;
receiving input in the 3D environment to modify the object data assigned to the object to modify the reward or the penalty to be given to the virtual character each time it has the interaction with the object, wherein the virtual character is rewarded or penalized for interactions associated with the object according to the modified reward or the modified penalty;
training the action determining component of the virtual character using a reinforcement learning technique that accounts for rewards or penalties obtained by the virtual character for interactions associated with the object;
receiving a visual interaction to progress forward in time along a future timeline of potential decision points and review hypothetical future actions of the virtual character; and
receiving a visual interaction to modify the reward or the penalty on the future timeline for assignment to the virtual character, wherein modifying the reward or the penalty on the future timeline is based on a selected decision point of the potential decision points, the selected decision point associated with a hypothetical future action of the hypothetical future actions.

12. The device of claim 1, wherein the object includes a plurality of related hierarchical items, further comprising:
interactively modifying a corresponding reward or a corresponding penalty for one or more of the plurality of related hierarchical items.

13. The device of claim 11, wherein receiving input in the 3D environment to modify the object data assigned to the object comprises:
receiving a visual or voice selection of the object and adding a positive or a priority reward to the object in the 3D environment.

14. The device of claim 11, wherein receiving input in the 3D environment to modify the object data assigned to the object comprises:
receiving a visual interaction to modify the object data in an imagination space of a planning system of the virtual character;
wherein the imagination space is a SR setting that provides specific possible future timelines and a historical timeline in the 3D environment of interactions with the 3D environment from the point of view of the virtual character, wherein a timeline includes a plurality of deterministic decision points.

15. A method, comprising:
at an electronic device with a processor:
providing a 3D environment for training an action determining component of a virtual character using reinforcement learning;
generating actions for the virtual character in the 3D environment according to the action determining component of the virtual character, wherein the virtual character is rewarded or penalized for interactions associated with an object in the 3D environment according to object data assigned to the object and specifying a reward or a penalty to be given to the virtual character each time it has an interaction with the object;
receiving input in the 3D environment to modify the object data assigned to the object to modify the reward or the penalty to be given to the virtual character each time it has the interaction with the object, wherein the virtual character is rewarded or penalized for interactions associated with the object according to the modified reward or the modified penalty;

training the action determining component of the virtual character using a reinforcement learning technique that accounts for rewards or penalties obtained by the virtual character for interactions associated with the object;

receiving a visual interaction to progress backward in time along a historical timeline of historical decision points and review previous actions of the virtual character; and receiving a visual interaction to modify the reward or the penalty on the historical timeline for assignment to the virtual character, wherein modifying the reward or the penalty along the historical timeline is based on a selected decision point of the historical decision points, the selected decision point associated with a past action of the previous actions.

16. The method of claim 15, wherein the object includes a plurality of related hierarchical items, further comprising:
   interactively modifying a corresponding reward or a corresponding penalty for one or more of the plurality of related hierarchical items.

17. The method of claim 15, wherein receiving input in the 3D environment to modify the object data assigned to the object comprises:
   receiving a visual or voice selection of the object and adding a positive or a priority reward to the object in the 3D environment.

18. The method of claim 15, wherein receiving input in the 3D environment to modify the object data assigned to the object or concept comprises:
   receiving a visual interaction to modify the object data in an imagination space of a planning system of the virtual character,
   wherein the imaginations space is a SR setting that provides specific possible future timelines and a historical timeline in the 3D environment of interactions with the 3D environment from the point of view of the virtual character, wherein a timeline includes a plurality of deterministic decision points.

19. The non-transitory computer-readable storage medium of claim 1, wherein the reward or the penalty is modified by said increasing or said decreasing, over time, the level of the reward or the penalty to be given to the virtual character.

20. The non-transitory computer-readable storage medium of claim 15, further comprising:
   receiving an interaction for selection of the imagination space of the virtual character;
   receiving a visual interaction to visually review a plurality of hierarchical factors used to generate a resulting deterministic decision at the selected decision point; and
   updating the reinforcement learning technique for the action determining component of the virtual character with the modified reward or the modified penalty on the historical timeline from the imagination space.

* * * * *

UNITED STATES PATENT AND TRADEMARK OFFICE
CERTIFICATE OF CORRECTION

| | |
|---|---|
| PATENT NO. | : 12,056,581 B1 |
| APPLICATION NO. | : 16/786097 |
| DATED | : August 6, 2024 |
| INVENTOR(S) | : Novaira Masood et al. |

It is certified that error appears in the above-identified patent and that said Letters Patent is hereby corrected as shown below:

In the Claims

Claim 8, Column 19, Line 35 reads:
"…selected decision point; …"
Should read:
--… selected decision point; and …--

Claim 12, Column 20, Line 26 reads:
"12. The device of claim 1, …"
Should read:
--12. The device of claim 11, …--

Signed and Sealed this
Eighth Day of October, 2024

Katherine Kelly Vidal
*Director of the United States Patent and Trademark Office*